(12) United States Patent
Gao et al.

(10) Patent No.: US 11,340,160 B2
(45) Date of Patent: May 24, 2022

(54) METHOD FOR NEAR-INFRARED SPECTRAL WAVELENGTH SELECTION BASED ON IMPROVED TEAM PROGRESS ALGORITHM

(71) Applicant: Jiangnan University, Wuxi (CN)

(72) Inventors: Meifeng Gao, Wuxi (CN); Huanming Tao, Wuxi (CN); Lige Yu, Wuxi (CN)

(73) Assignee: JIANGNAN UNIVERSITY, Wuxi (CN)

(*) Notice: Subject to any disclaimer, the term of this patent is extended or adjusted under 35 U.S.C. 154(b) by 0 days.

(21) Appl. No.: 17/556,461

(22) Filed: Dec. 20, 2021

(65) Prior Publication Data

US 2022/0113250 A1    Apr. 14, 2022

Related U.S. Application Data

(63) Continuation of application No. PCT/CN2021/102132, filed on Jun. 24, 2021.

(30) Foreign Application Priority Data

Jun. 30, 2020   (CN) .......................... 202010621716.6

(51) Int. Cl.
*G01N 21/359* (2014.01)
*G01N 21/84* (2006.01)

(52) U.S. Cl.
CPC ... *G01N 21/359* (2013.01); *G01N 2021/8466* (2013.01); *G01N 2201/12* (2013.01)

(58) Field of Classification Search
None
See application file for complete search history.

(56) References Cited

U.S. PATENT DOCUMENTS

2018/0293331 A1* 10/2018 Olson .................... G06F 17/18

FOREIGN PATENT DOCUMENTS

| CN | 101825567 A | 9/2010 |
|---|---|---|
| CN | 106596456 A | 4/2017 |

(Continued)

*Primary Examiner* — Edwin C Gunberg
(74) *Attorney, Agent, or Firm* — IPro, PLLC (57) ABSTRACT

The disclosure discloses a method for near-infrared spectral wavelength selection based on an improved team progress algorithm (iTPA), belonging to the field of near-infrared spectral detection. The method includes: equally dividing near-infrared spectral wavebands to be selected into elite groups, ordinary groups and garbage collection groups according to evaluation values from high to low; generating a new waveband in the elite group or the ordinary group, where a wavelength point of the new waveband is selected from a random waveband in the selected group, and the wavelength point of the new waveband inherits the selected wavelength point; and enabling the inherited new waveband to select a learning behavior or an exploration behavior according to a set probability to update the wavelength point of the new waveband to generate a candidate waveband; and selecting a waveband with a highest evaluation value in the elite group as the waveband to be selected. Under the condition of ensuring the model prediction accuracy, the disclosure greatly reduces the number of wavelength variables, reduces the complexity of the algorithm at the same time, and improves the non-destructive detection accuracy in crops.

10 Claims, 3 Drawing Sheets

(56) References Cited

FOREIGN PATENT DOCUMENTS

| CN | 107315902 | A | 11/2017 |
| CN | 111795944 | A | 10/2020 |
| JP | 2017053699 | A | 3/2017 |

\* cited by examiner

METHOD FOR NEAR-INFRARED SPECTRAL WAVELENGTH SELECTION BASED ON IMPROVED TEAM PROGRESS ALGORITHM

TECHNICAL FIELD

The disclosure herein relates to the field of near-infrared spectral detection, and specifically relates to a method for near-infrared spectral wavelength selection based on an improved team progress algorithm.

BACKGROUND

With the substantial improvement of comprehensive strength in China, people have higher and higher requirements for quality of products, including fruits, crops, foods, etc. In the field of industrial process detection, it is necessary to detect the quality of ingredients such as oils and chemicals, not only requiring a rapid and non-destructive detection technology, but also pursuing detection accuracy. With the continuous improvement of urbanization, the contradiction between the demand for a more accurate and convenient detection technology and the current relatively backward detection technology level is escalating. In the context of many applications, a near-infrared spectral analysis technology has emerged.

As an online analysis technology, the near-infrared spectral analysis technology has the advantages of fast analysis speed, high efficiency, low cost and non-destructive detection, and has been extended to many fields such as petrochemical industry, pharmaceutical industry, clinical medicine and food industry. The near-infrared spectral analysis technology is mainly divided into three parts: preprocessing of spectra, wavelength selection and establishment of prediction models. In an analysis process, wavelengths containing the most information of prediction objects are selected from a large amount of spectral data through the step of wavelength selection, and thus, these selected wavelengths are input into a trained prediction model to obtain a prediction result. The closer the prediction result is to a true value, the more accurate the detection result will be. Therefore, the prediction accuracy of the prediction model is a crucial parameter, and the prediction accuracy depends on the prediction model to a certain extent, and depends on whether the wavelengths containing the most information of the prediction objects can be selected to a greater extent. As a result, one of the most important steps in the near-infrared spectral analysis technology is to select wavelength variables.

As mentioned above, the near-infrared spectral analysis technology is generally accompanied by a large amount of spectral data, ranging from a few hundred to as many as thousands. A large amount of spectral data will cause insignificant prediction effect of the prediction model, and it also will increase the prediction time, which is not conducive to online real-time analysis. Therefore, wavelength selection of the collected spectral data can greatly reduce the complexity of the prediction model, effectively prevent the over-fitting phenomenon of the prediction model, accelerate the prediction speed, enhance the robustness of the model, while also improve the prediction accuracy.

The existing algorithms for selecting wavelengths mainly include principal component analysis (PCA), synergy interval partial least squares (siPLS), a team progress algorithm (TPA), uninformative variable elimination (UVE), a genetic algorithm (GA), etc. The PCA is a dimensionality-reduced statistical method which uses an orthogonal transformation to transform original random vectors whose components are associated to new random vectors whose components are not associated. The application of the PCA in spectral selection can select a very small number of wavelengths to effectively reduce the model volume, but also eliminates a lot of effective variable information, resulting in insufficient final prediction accuracy. The GA is a method of simulating natural evolution processes to search for an optimal solution, which transforms the solution of the problem into processes similar to the crossover, mutation and duplication of chromosomal genes in biological evolution. In the process of wavelength selection, the spectral data is regarded as a chromosome and is divided into several spectral band, each waveband corresponds to a gene on the chromosome and is encoded in the form of 0-1, 1 means that the waveband is selected, 0 means that the waveband is not selected, the size of an initial population is customized to perform iterative evolution, and optimal individuals are selected. When solving relatively complex combinatorial optimization problems, such as spectral wavelength selection, the GA can usually obtain better optimization results faster, but generally can only select nearly half of wavelength variables, and is not suitable for some scenes with low calculation model levels. Hailiang Zhang et al. (Hailiang Zhang, Wei Luo, Xuemei Liu, Yong He. Measurement of soil organic matter with near-infrared spectroscopy Combined with genetic algorithm and successive projection algorithm [J]. Spectroscopy and Spectral Analysis, 2017, 37(2): 584-587.) proposed a genetic algorithm combined with a successive projection algorithm. After the GA is used to select spectral variables, the successive projection algorithm is used to further select spectral wavelengths. Finally, 18 variables are selected for modeling. At the same time, due to the lack of group diversity, the GA is prone to premature convergence in practical applications. Xin Zhao et al. (Xin Zhao, Qibing Zhu, Min Huang, Haiyan Cen. An IGA-PLSP method for FT-NIR wavelength selection for measuring soluble solid content of citrus fruits [J]. Analytical methods, 2013, 5(18): 4811-4817.) proposed IGA to optimize spectral regions combined with partial least squares projection (PLSP). The IGA introduces a biological immune mechanism into a standard genetic algorithm, which overcomes the premature defects of the GA and has a faster convergence speed. At the same time, after the IGA, the PLSP is performed to further select the wavelength variables, which overcomes the redundancy of sub-interval variables. Although the combination of the two algorithms has a good effect on selecting variables, the workload is greatly increased. The TPA proposed by Yaming Bo (Team progress algorithm for global optimization of multidimensional functions [J]. Journal of Nanjing University of Posts and Telecommunications (Natural Science Edition), 2008, 28(5): 7-14.) is a dual-group search algorithm which imitates the teamwork behavior of two groups in a team. The spectral variables are divided into several wavebands. The result of modeling the wavebands and the corresponding physical and chemical values is used as an evaluation value index. According to evaluation values, the wavebands are divided into elite groups and ordinary groups, then, corresponding learning and exploration processes are performed, and reasonable waveband updating rules are designed to update the wavebands to gradually increase the evaluation values thereof to achieve the global optimum. The TPA is much simpler than the GA, and the number of the selected wavelengths is also very small. However, since the adjustment is performed to an opposite direction of an ordinary group template during selection of wavelengths, and an evaluation value of the ordinary group template increases in an iterative process, a good adjustment direction cannot be provided later. As a result, not all of the selected wavelengths contain the most information of the prediction objects, so that the subsequent prediction accuracy needs to be further improved.

SUMMARY

In order to further improve the prediction accuracy of the near-infrared spectral analysis technology to obtain a more accurate detection result, the disclosure provides a method for near-infrared spectral wavelength selection based on an improved team progress algorithm (iTPA), including:

step 1: equally dividing near-infrared spectral wavebands to be selected into P wavebands, and determining an evaluation value of each waveband in the P wavebands, where each waveband includes a plurality of wavelength points, and the P wavebands are all regarded as members in an iTPA model;

step 2: dividing the P wavebands into N elite groups, M ordinary groups and L garbage collection groups according to the evaluation values from high to low, where N, M and L are integers respectively;

step 3: generating a new waveband in the elite group or the ordinary group, where a wavelength point of the new waveband is inherited from a wavelength point selected in a random waveband in the group where the new waveband is generated;

step 4: enabling the new waveband to select a learning behavior or an exploration behavior according to a preset probability to update the wavelength point of the new waveband to generate a candidate waveband, where the sum of probabilities of selecting the learning behavior and the exploration behavior by the new waveband is 100%;

step 5: updating the candidate waveband: comparing an evaluation value of the candidate waveband with the waveband values in the elite group, the ordinary group and the garbage collection group respectively to determine whether the candidate waveband enters the elite group, the ordinary group or the garbage collection group; and step 6: customizing a number of iteration updates, and after the iteration, selecting a waveband with a highest evaluation value in the elite group as the waveband to be selected.

Optionally, the iTPA model is:

$$\begin{cases} \min\{f(x)\} \\ X = [x_1, x_2, \ldots, x_n]^T \\ x_i \in [a_i, b_i], i = 1, 2, \ldots, n \end{cases} \quad (1)$$

where in Formula (1), a vector X represents a member, that is, a waveband containing a plurality of wavelengths, $x_1$-$x_n$ represent all wavelength points in the waveband, $x_i$ represents the ith wavelength point in the waveband, $b_i$ and $a_i$ respectively represent upper and lower boundary values of the wavelength point, and a function $f(x)$ represents an evaluation value of the waveband.

Optionally, the evaluation value $f(x)$ is a function with a root mean square error of calibration (RMSEC) and a correlation coefficient (R) as variables, wherein the RMSEC is obtained by partial least squares (PLS) modeling with the waveband X and measured content physical and chemical values. A calculation formula of the evaluation value is:

$$f(x) = \frac{R}{1 + RMSEC}, \quad (2)$$

where the evaluation value is gradually increased by updating the waveband X to search for an optimal waveband.

Optionally, the learning behavior includes: a new waveband $x_r$ is adjusted to a reference target direction, and the new waveband $x_r$ is generated in the ordinary group or the elite group;

the reference target direction of the new waveband generated in the ordinary group is generated from a template value in the elite group;

the reference target direction of the new waveband generated in the elite group is generated from a template value in the garbage collection group;

the template value includes: an elite group template $e_e$ and a garbage collection group template $e_l$; the template value is taken from a mean value of the wavelengths of the wavebands in the group where the template value is located;

an expression of generating a candidate waveband by the new waveband $x_r$ generated in the ordinary group after selecting the learning behavior is:

$$x_c = (1-\gamma)x_r + \gamma e_e \quad (3); \text{ and}$$

an expression of generating a candidate waveband by the new waveband $x_r$ generated in the elite group after selecting the learning behavior is:

$$x_c = (1+\gamma)x_r - \gamma e_l \quad (4),$$

where in Formula, $\gamma$ represents a random number in an interval [0,1], and $x_c$ represents a candidate waveband.

Optionally, the new waveband generates a candidate waveband through an exploration behavior, including:

$$x_c = [x_{c1}, x_{c2}, \ldots, x_{cn}]^T \quad (5)$$

$$x_{ci} = \begin{cases} x_{ri} + \gamma_i t_{e,p}(b_i - x_{ri}), m_i = 0 \\ x_{ri} + \gamma_i t_{e,p}(x_{ri} - a_i), m_i = 1 \end{cases}$$

$$t_{e,p} = \left(1 - \frac{k}{K}\right)^{a_{e,p}},$$

where in Formula, T represents a matrix transposition symbol, and $x_{ri}$ represents a wavelength corresponding to the new waveband, that is, the ith wavelength of the waveband, i=1, 2, . . . , n; K represents a maximum number of iterations of the algorithm, and k represents the current cumulative number of iterations;

a shrinkage index $a_{e,p}$ represents: $a_e$ is selected when the new waveband is inherited from the elite group, and $a_p$ is selected when the new waveband is inherited from the ordinary group; and $\gamma_i$ represents a random number in an interval (0, 1), and $m_i$ takes a value between 0 and 1 randomly.

Optionally, before step 1, the method further includes: eliminating abnormal data in spectra by a Mahalanobis distance, and dividing the remaining sample points into calibration sets and prediction sets by a K-S method after eliminating the abnormal data in the spectra.

Optionally, the update of the candidate waveband in step 5 includes:

if an evaluation value of the candidate waveband $x_c$ is higher than an evaluation value of the last $x_{ewst}$ in the elite group, $x_c$ enters the elite group, at the same time, evaluation values in the elite group are sorted again, and the last $x_{ewst}$ in the elite group after sorting again is directly eliminated without entering the ordinary group; the $x_{ewst}$ is a waveband with a lowest evaluation value in the elite group;

if the evaluation value of the candidate waveband $x_c$ is lower than an evaluation value of the $x_{ewst}$ but higher than an evaluation value of the last $x_{pwst}$ in the ordinary group, whether the $x_c$ is obtained by exploration is checked, if the $x_c$ is obtained by exploration, the $x_c$ enters the ordinary group, at the same time, evaluation values in the ordinary group are sorted again, and the last $x_{pwst}$ in the ordinary group after sorting again is eliminated; the $x_{pwst}$ is a waveband with a lowest evaluation value in the ordinary group; if the $x_c$ is not obtained by exploration, the $x_c$ is directly discarded;

if the evaluation value of the candidate waveband $x_c$ is lower than an evaluation value of the first $x_{lbst}$ in the garbage collection group, the $x_c$ enters the garbage collection group, at the same time, evaluation values in the garbage collection group are sorted again, and the $x_{lbst}$ waveband in the garbage collection group after sorting again is eliminated to enable the evaluation values in the garbage collection group to be low all the time; the $x_{lbst}$ is a waveband with a highest evaluation value in the garbage collection group; and after the update of the waveband every time, the evaluation values in the three groups are sorted.

Optionally, a shrinkage index of the new waveband inherited from the ordinary group is half of that inherited from the elite group.

Optionally, a probability of selecting the learning behavior by a new member is 0.35, and a probability of selecting the exploration behavior by the new member is 0.65.

The method for near-infrared spectral wavelength selection based on an iTPA in the disclosure is applied to non-destructive detection of crops.

Beneficial Effect

1. The method for near-infrared spectral wavelength selection based on an iTPA, provided by the disclosure, divides near-infrared spectral wavebands into elite groups, ordinary groups and garbage collection groups according to evaluation values from high to low. The new waveband in the disclosure is generated in the elite group. Different from a traditional TPA which performs adjustment to an opposite direction of an ordinary group template, the disclosure performs adjustment to an opposite direction of a garbage collection group template. Since an evaluation value of the ordinary group template increases in an iterative process, a good adjustment direction cannot be provided later. However, an evaluation value of the garbage collection group template is low throughout the process, so that a good adjustment direction can be effectively provided for the new waveband generated in the elite group. As a result, on the premise of ensuring the model prediction accuracy, the number of wavelength variables is greatly reduced, at the same time, the complexity of the algorithm is reduced, and the detection accuracy of non-destructive detection in crops (such as corn) is improved.

DETAILED DESCRIPTION

The disclosure will be further described in detail below with reference to the accompanying drawings and examples.

Example 1

Figure 1:
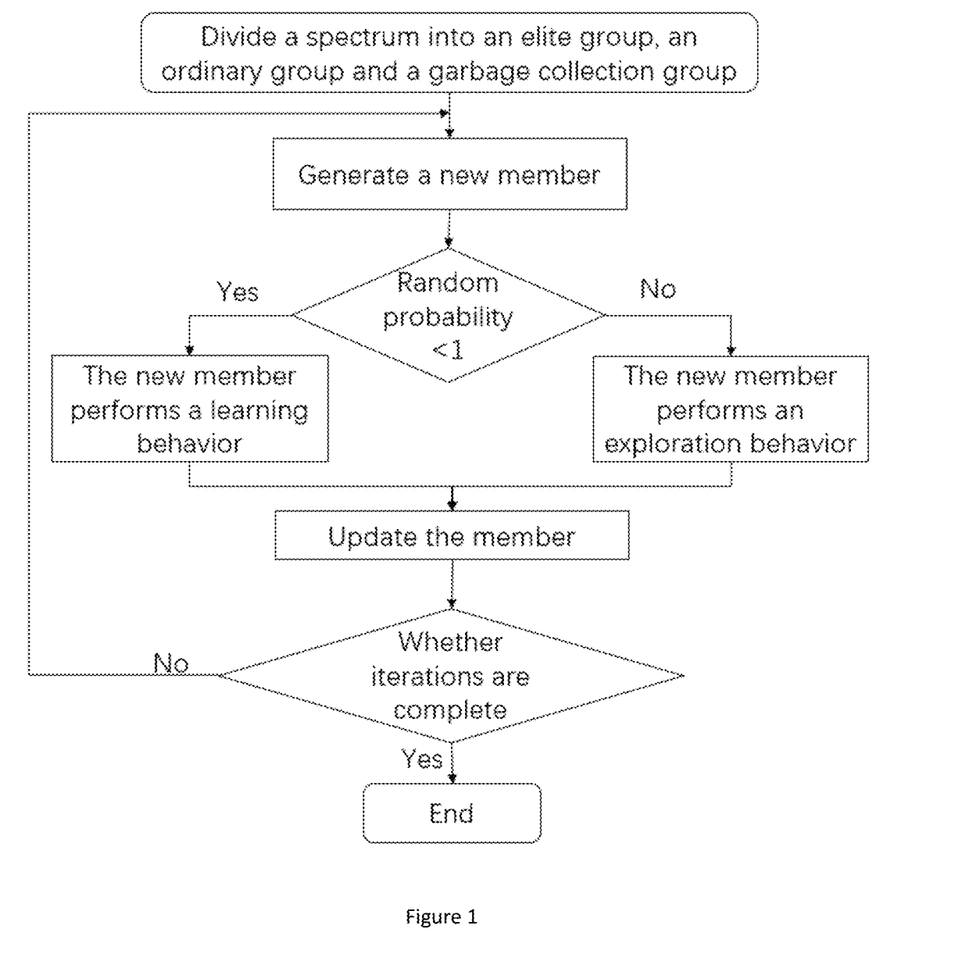
FIG. 1 is a schematic flow diagram of the iTPA of the disclosure for wavelength selection.

As shown in FIG. 1, this example proposes a method for near-infrared spectral wavelength selection based on an iTPA, which is applied to a group of standard corn near-infrared spectral data sets. The spectral data set is quoted from open-source corn sample spectral data sets on the eigenvector website (https://eigenvector.com/resources/data-sets/).

The data set includes 80 corn samples which are respectively measured by three spectrometers (m5, mp5, mp6). A wavelength range is 1100 nm to 2498 nm, an interval is 2 nm (700 variable), and the moisture, oil, protein and starch value of each sample are included. The data in the data set is originally collected at Cargill. The experimental data adopts the sample data collected by the device mp5 in the data set and the corresponding protein content value.

The method includes:

Step 1: Abnormal points are eliminated, and sample sets are divided.

Figure 2:
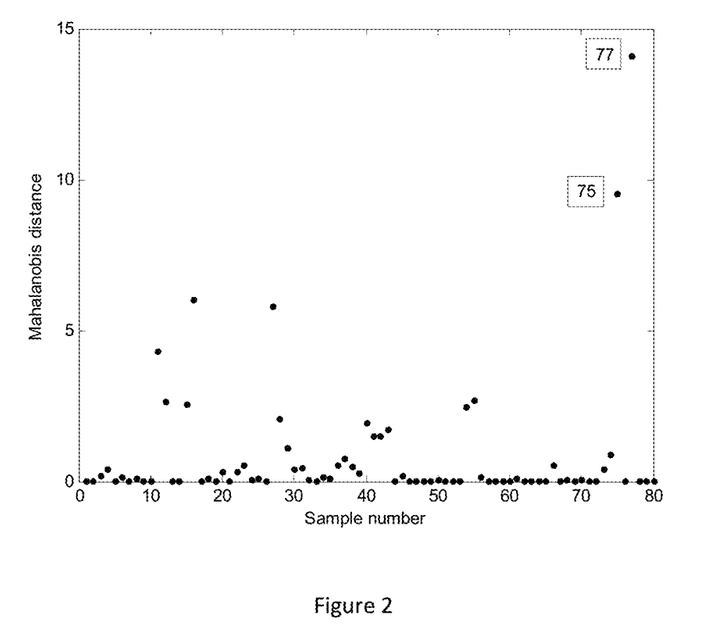
FIG. 2 is a distribution diagram of a Mahalanobis distance from each data sample point to a data center point.

Considering that errors will be generated when measuring spectral data by instruments and abnormal spectra will be obtained, which will affect the model performance, the Mahalanobis distance is first used to eliminate the abnormal data in the spectra. FIG. 2 is a distribution diagram of a Mahalanobis distance from each data sample point to a data center point. It can be seen from FIG. 2 that in the data of the 80 corn samples in this example, there are 2 abnormal data, and 78 samples are retained after the abnormal data are eliminated according to the Mahalanobis distance.

Figure 3:
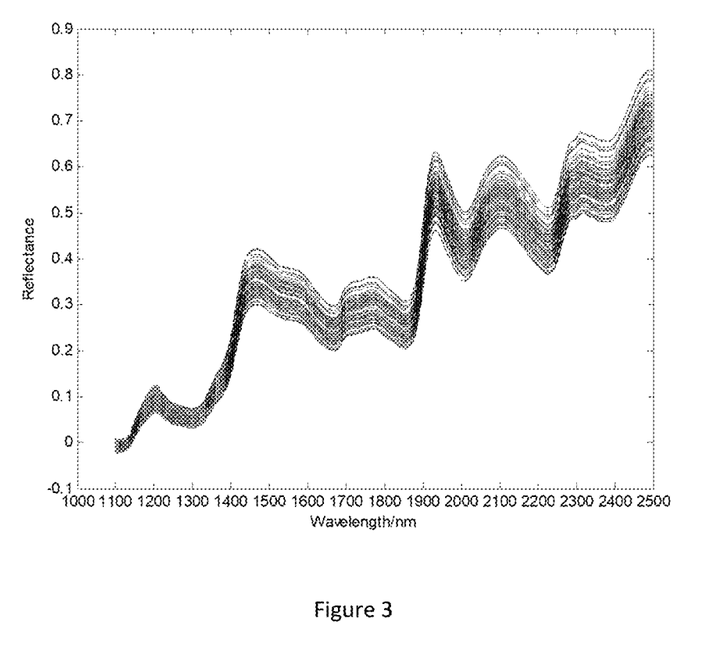
FIG. 3 is an original spectrum diagram after eliminating abnormal samples.

FIG. 3 is an original spectrum diagram after eliminating abnormal samples. The remaining 78 sample points are divided into a calibration set and a prediction set by a K-S method. The division result includes 50 calibration set samples and 28 prediction set samples. Table 1 shows the statistics of protein content values in the calibration set and the prediction set.

TABLE 1

| Protein content values (unit: g, content in per 100 g of corn) in calibration set and prediction set | | | | |
| --- | --- | --- | --- | --- |
| | Maximum value | Minimum value | Mean value | Standard deviation |
| Calibration set | 9.5950 | 7.6540 | 8.5692 | 0.4852 |
| Prediction set | 9.7110 | 8.1120 | 8.8488 | 0.4980 |

Step 2: An iTPA model is set to imitate learning and exploration processes of three groups in a team, namely learning and exploration processes of an elite group, an ordinary group and a garbage collection group, and reasonable member updating rules are designed to gradually increase the evaluation values thereof to achieve the global optimum. The algorithm model is expressed as follows:

$$\begin{cases} \min\{f(x)\} \\ X = [x_1, x_2, \ldots, x_n]^T \\ x_i \in [a_i, b_i], i = 1, 2, \ldots, n \end{cases} \quad (1)$$

where in Formula (1), a vector X represents a waveband containing a plurality of wavelengths, $x_1$-$x_n$ represent all wavelength points in the waveband, $x_i$ represents the ith wavelength point in the waveband, $b_i$ and $a_i$ respectively represent upper and lower boundary values of the wavelength point, and a function $f(x)$ represents an evaluation value of the waveband. The evaluation value is a function with a root mean square error of calibration (RMSEC) and a correlation coefficient (R) as variables, wherein the RMSEC is obtained by partial least squares (PLS) modeling with the waveband X and measured content physical and chemical values. A calculation formula of the evaluation value is:

$$f(x) = \frac{R}{1 + RMSEC}. \quad (2)$$

The evaluation value is gradually increased by updating the waveband to search for an optimal waveband.

Considering that in some practical application scenes, a waveband with a lowest evaluation value may be used as an optimal waveband, according to actual needs, the method of the application can also search for an optimal waveband by updating the waveband to gradually reduce the evaluation value. In this example, the evaluation value is gradually increased to search for an optimal waveband.

Step 3: An entire spectral waveband (that is, the calibration set after the division of the sample sets) is equally divided into P wavebands, and at the same time, an evaluation value of each waveband is determined, where each waveband is equivalent to the vector X in step 2.

The P wavebands are divided into N+M+L wavebands according to evaluation values from high to low, where N, M and L are integers respectively. The first N wavebands with highest evaluation values form the elite group, $x_e$ represents wavebands in the elite group, and there are N wavebands in total. The M wavebands with moderate evaluation values form the ordinary group, $x_p$ represents wavebands in the ordinary group, and there are M wavebands in total. The last L wavebands with lowest evaluation values form the garbage collection group, $x_l$ represents wavebands in the garbage collection group, and there are L wavebands in total.

The garbage collection group is a newly added group in the method of the application, and the evaluation values in this group are kept extremely low in an entire iterative process. The values of the N, M and L are generally taken according to experience, and the values of the N, M and L cannot be too different from each other.

In this example, the total number of members is set to 35, that is, P=35. PLS modeling is performed on each waveband and protein physical and chemical values to obtain an evaluation value corresponding to the waveband, where the number of elite groups is 10, the number of ordinary groups is 10, and the number of garbage collection groups is 15.

Step 4: A new waveband $x_r$ is generated.

A method for generating the new waveband is: the new waveband is generated from any one of the elite group and the ordinary group, and the wavelength point of the new waveband is inherited from the same wavelength point of a random waveband in the current group. That is, if the new waveband is generated from the elite group, and if the nth wavelength point of the new waveband is generated in the mth waveband in the elite group, this wavelength point needs to inherit the nth wavelength point in the mth waveband in the elite group.

Step 5: The new waveband $x_r$ selects a learning behavior or an exploration behavior according to a set probability l to update the wavelength point of the new waveband $x_r$, so as to generate a candidate waveband $x_c$. The sum of probabilities of selecting the learning behavior and the exploration behavior is 100%. In this example, a probability l of selecting the learning behavior by the new waveband $x_r$ is set to 0.35, and a probability of selecting the exploration behavior by the new waveband $x_r$ is set to 0.65.

Learning Behavior:

If the new waveband $x_r$ performs the learning behavior, adjustment needs to be performed to a reference target direction. The reference target direction is respectively generated from template values of the elite group and the garbage collection group, which are respectively called an elite group template $e_e$ and a garbage collection group template $e_l$; and the template value is taken from a mean value of the wavelengths of the wavebands in the group where the template value is located.

If the new waveband is generated in the ordinary group, adjustment is performed to the elite group template.

If the new waveband is generated in the elite group, adjustment is performed to an opposite direction of the garbage collection group template. The reason for the adjustment to the opposite direction of the garbage collection group template instead of adjustment to the opposite direction of the ordinary group template like the TPA is because an evaluation value of the ordinary group template increases in an iterative process, and a good adjustment direction cannot be provided later. However, an evaluation value of the garbage collection group template is low throughout the process, so that a good adjustment direction can be effectively provided for the new waveband $x_r$ generated in the elite group.

Specifically, when the new waveband is generated in the ordinary group, an expression of generating a candidate waveband by selecting the learning behavior to update the wavelength point of the new waveband is:

$$x_c = (1-\gamma)x_r + \gamma e_e \quad (3)$$

When the new waveband is generated in the elite group, an expression of generating a candidate waveband by selecting the learning behavior to update the wavelength point of the new waveband is:

$$x_c = (1+\gamma)x_r - \gamma e_l \quad (4)$$

In Formula (3) and Formula (4), γ is a random number in an interval [0,1]. If a certain wavelength point of the $x_c$ crosses the boundary, a boundary value thereof is used instead. A near-infrared spectral wavelength range set in this example is 1100-2498 nm, that is, boundary values are 1100 nm and 2498 nm.

Exploration Behavior:

If the new waveband $x_r$ performs the exploration behavior, each of the wavelength points $x_i$ (i=1, 2, . . . , n) is randomly changed, and the exploration intensity is gradually reduced. An expression of generating the $x_c$ by two groups of new wavebands $x_r$ through the exploration behavior is:

$$x_c = [x_{c1}, x_{c2}, \ldots, x_{cn}]^T \quad (5)$$

$$x_{ci} = \begin{cases} x_{ri} + \gamma_i t_{e,p}(b_i - x_{ri}), & m_i = 0 \\ x_{ri} + \gamma_i t_{e,p}(x_{ri} - a_i), & m_i = 1 \end{cases}$$

$$t_{e,p} = \left(1 - \frac{k}{K}\right)^{a_{e,p}}.$$

In Formula (5), $x_{ri}$ represents a wavelength corresponding to the new waveband, that is, the ith wavelength of the waveband; K represents a maximum number of iterations of the algorithm, and k represents the current cumulative number of iterations; a shrinkage index $a_{e,p}$ represents: $a_e$ is selected when the new waveband is inherited from the elite group, and $a_p$ is selected when the new waveband is inherited from the ordinary group; and $\gamma_i$ represents a random number in an interval (0, 1), and $m_i$ takes a integer between 0 and 1 randomly. In this example, the shrinkage index of the elite group is set to 20, and the shrinkage index of the ordinary group is generally half of that of the elite group, taking 10.

Step 6: Member (candidate) wavebands are updated, including:

6.1: If an evaluation value of the candidate waveband $x_c$ is higher than an evaluation value of the last $x_{ewst}$ in the elite group, $x_c$ enters the elite group, at the same time, evaluation values in the elite group are sorted again, and the last $x_{ewst}$ in the elite group after sorting again is directly eliminated without entering the ordinary group. The $x_{ewst}$ is a waveband with a lowest evaluation value in the elite group.

This is because the TPA sets the learning behavior which strengthens the directional search and local search abilities of the algorithm. If the eliminated last $x_{ewst}$ in the elite group enters the ordinary group, it is easy to cause the algorithm to fall into the local optimum.

6.2: If the evaluation value of the candidate waveband $x_c$ is lower than an evaluation value of the $x_{ewst}$ but higher than an evaluation value of the last $x_{pwst}$ in the ordinary group, whether the $x_c$ is obtained by exploration is checked;

if the $x_c$ is obtained by exploration, the $x_c$ enters the ordinary group, at the same time, evaluation values in the ordinary group are sorted again, and the last $x_{pwst}$ in the ordinary group after sorting is eliminated; the $x_{pwst}$ is a waveband with a lowest evaluation value in the ordinary group; and if the $x_c$ is not obtained by exploration, the $x_c$ is directly discarded. This is because the learning behavior is more likely to generate a candidate member with a high evaluation value and has strong convergence, which easily leads to the assimilation of wavebands in the ordinary group and reduces the global optimization ability.

6.3: If the evaluation value of the candidate waveband $x_c$ is lower than an evaluation value of the first $x_{lbst}$ in the garbage collection group, the $x_c$ enters the garbage collection group, at the same time, evaluation values in the garbage collection group are sorted again, and the $x_{lbst}$ waveband in the garbage collection group after sorting is eliminated to enable the evaluation values in the garbage collection group to be low all the time, thereby providing a more correct update direction for the new waveband inherited from the elite group to perform the learning behavior. The $x_{lbst}$ is a waveband with a highest evaluation value in the garbage collection group.

Step 7: A number of iteration updates is customized. In this example, the number of iterations is set to 1000. After the iteration, a waveband with a highest evaluation value in the elite group is selected as the waveband object to be selected.

Example 2

In order to examine the effect of the variable selection algorithm proposed in Example 1 on modeling prediction, the settings are as follows:

The total number of members is set to 35, that is, P=35, where the number of elite groups is 10, the number of ordinary groups is 10, and the number of garbage collection groups is 15.

A probability of selecting the learning behavior by a new member is set to 0.35, that is, a probability of selecting the exploration behavior is 0.65.

The shrinkage index of the elite group is set to 20, and the shrinkage index of the ordinary group is generally 10 which is half of that of the elite group.

The number of iterations is set to 1000.

Figure 4:
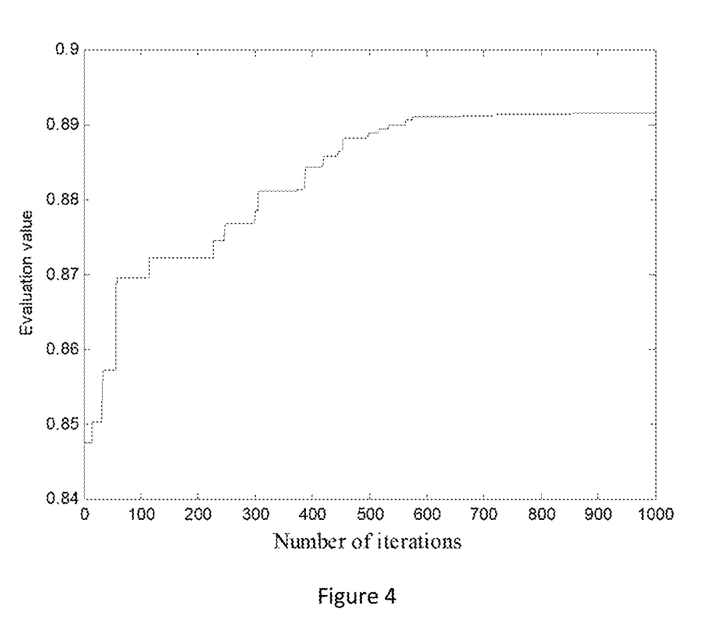
FIG. 4 is a schematic diagram of evaluation values of optimal wavebands in an elite group in an iterative process of the iTPA.

FIG. 4 shows evaluation values of optimal wavebands in elite groups in an iterative process of the algorithm.

Classical near-infrared spectral wavelength selection algorithms, such as a genetic algorithm (GA), principal component analysis (PCA) and a team progress algorithm (TPA), are compared with the improved team progress algorithm (iTPA) proposed in the application in selection variable modeling effect.

In the GA, an original spectrum is equally divided into a plurality of sub-intervals, and an optimal sub-interval combination corresponding to a maximum fitness value is obtained by evolution iteration. A PLS model is established based on the wavebands selected by genes, R and RMSEC values of the model are calculated, and a fitness function F is consistent with an evaluation value function $f(x)$ in Formula (2) as follows:

$$F = \frac{R}{1 + RMSEC}. \quad (8)$$

The total 700 wavelength points of the original spectrum are divided into 35 equidistant intervals, that is, the length of a genetic code is 35, and each gene contains 20 wavelength points. The number of groups is set to 50, a crossover probability is set to 0.85, a mutation probability is set to 0.1, and a maximum number of iterations is set to 200 generations. In a population evolution process, optimal fitness individuals in the evolution process within a maximum number of iterations are found. Due to the randomness of the GA, the TPA and the iTPA, the above three algorithms are respectively operated for 50 times to obtain a mean value.

Figure 5:
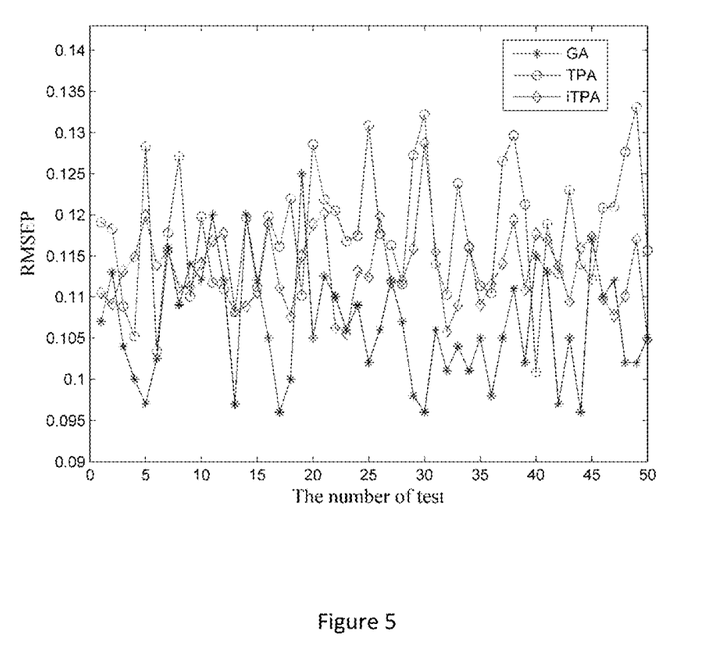
FIG. 5 is a schematic diagram of root mean square error of prediction (RMSEP) values in 50 tests for a GA, a TPA and an iTPA to perform wavelength selection on spectral data respectively.

FIG. 5 shows RMSEP values in 50 tests for the GA, the TPA and the iTPA to perform wavelength selection on spectral data respectively. It can be seen from the figure that the prediction accuracy of the iTPA is improved compared with the original TPA and is slightly inferior to that of the GA, but the number of variables selected by the iTPA is much less than that selected by the GA.

The original spectrum is subjected to PCA dimensionality reduction to select wavelength variables, and the variables with the top 20 contribution rates are selected. Through calculation, the cumulative contribution rate of the top 20 variables reaches 0.999997. The 20 variables and protein content are subjected to PLS modeling, and relevant predicted values are obtained. Relevant evaluation parameters obtained by PLS modeling include: an RMSEP, a relevant coefficient of prediction (Rp), an RMSEC and a relevant coefficient of calibration (Rc), where the smaller the RMSEP and the RMSEC, the higher the prediction accuracy; the larger the Rp and the Rc, the higher the prediction accuracy; and in the same case of PLS modeling, the higher the prediction accuracy, the more information of the prediction objects contained in the wavelengths selected, and the better the wavelength selection method.

Analytical data: it can be seen from Table 2 that through the wavelength selection method iTPA-PLS proposed in the application, the RMSEP is 0.1177, the Rp is 0.9704, the RMSEC is 0.1019, and the Rc is 0.9759. Through the full-spectrum PLS (that is, a method of using full-spectrum data for prediction without wavelength selection), the RMSEP is 0.1789. Through the existing TPA-PLS, the RMSEP is 0.1193. The GA-PLS has the best overall prediction effect, but the mean number of wavelength points selected by the GA-PLS is as high as 346, which is far greater than the mean number of wavelength points (19.60) selected by the wavelength selection method proposed in the application.

By performing PCA on the original spectrum, 20 wavelength points (the contribution rate reaches 0.999997) are selected to compare with the wavelength selection method proposed in the application, which selects nearly the same number of wavelengths. The model RMSEP obtained after wavelength selection by PCA is 0.2306, which is far greater than the RMSEP value obtained by the iTPA. Therefore, the wavelength selection method proposed in the application can greatly reduce the number of wavelength points on the premise of maintaining the predictive ability, and effectively reduce the calculation amount of modeling.

TABLE 2

Algorithm comparison

| | Number of wavelengths | Rc | RMSEC | Rp | RMSEP |
|---|---|---|---|---|---|
| F-PLS | 700 | 0.9517 | 0.1474 | 0.9307 | 0.1789 |
| GA-PLS | 346 | 0.9791 | 0.0978 | 0.9735 | 0.1114 |
| TPA-PLS | 19.64 | 0.9755 | 0.1056 | 0.9696 | 0.1193 |
| iTPA-PLS | 19.60 | 0.9759 | 0.1019 | 0.9704 | 0.1177 |
| PCA | 20 | 0.9569 | 0.1417 | 0.8916 | 0.2306 |

The protection scope of the disclosure is not limited to the above examples. Any modification, equivalent replacement and improvement that can be made by the persons skilled in the art within the spirit and principle of the concept of the disclosure shall be included in the protection scope of the disclosure.

What is claimed is:

1. A method for near-infrared spectral wavelength selection based on an improved team progress algorithm (iTPA), comprising:
   step 1: equally dividing near-infrared spectral wavebands to be selected into P wavebands, and determining an evaluation value of each waveband in the P wavebands, wherein each waveband comprises a plurality of wavelength points, and the P wavebands are all regarded as members in an iTPA model;
   step 2: dividing the P wavebands into N elite groups, M ordinary groups and L garbage collection groups according to the evaluation values from high to low, wherein N, M and L are integers respectively;
   step 3: generating a new waveband in the elite group or the ordinary group, wherein a wavelength point of the new waveband is inherited from a wavelength point selected in a random waveband in the group where the new waveband is generated;
   step 4: enabling the new waveband to select a learning behavior or an exploration behavior according to a preset probability to update the wavelength point of the new waveband to generate a candidate waveband, wherein the sum of probabilities of selecting the learning behavior and the exploration behavior by the new waveband is 100%;
   step 5: updating the candidate waveband: comparing an evaluation value of the candidate waveband with the waveband values in the elite group, the ordinary group and the garbage collection group respectively to determine whether the candidate waveband enters the elite group, the ordinary group or the garbage collection group; and
   step 6: customizing a number of iteration updates, and after the iteration, selecting a waveband with a highest evaluation value in the elite group as the waveband to be selected.

2. The method for near-infrared spectral wavelength selection based on an iTPA according to claim 1, wherein the iTPA model is:

$$\begin{cases} \min\{f(x)\} \\ X = [x_1, x_2, \ldots, x_n]^T \\ x_i \in [a_i, b_i], i = 1, 2, \ldots, n \end{cases} \quad (1)$$

where in Formula (1), a vector X represents a member, that is, a waveband containing a plurality of wavelengths, $x_1$-$x_n$ represent all wavelength points in the waveband, $x_i$ represents a ith wavelength point in the waveband, $b_i$ and $a_i$ respectively represent upper and lower boundary values of the wavelength point, and a function $f(x)$ represents an evaluation value of the waveband.

3. The method for near-infrared spectral wavelength selection based on an iTPA according to claim 2, wherein the evaluation value $f(x)$ is a function with a root mean square error of calibration (RMSEC) and a correlation coefficient (R) as a variables, where in the RMSEC is obtained by partial least squares (PLS) modeling with a waveband X and measured content physical and chemical values, and a calculation formula of the evaluation value is:

$$f(x) = \frac{R}{1 + RMSEC}, \quad (2)$$

wherein the evaluation value is gradually increased by updating the waveband X to search for an optimal waveband.

4. The method for near-infrared spectral wavelength selection based on an iTPA according to claim 3, wherein the learning behavior comprises: a new waveband $x_r$ is adjusted to a reference target direction, and the new waveband $x_r$ is generated in the ordinary group or the elite group;
   the reference target direction of the new waveband generated in the ordinary group is generated from a template value in the elite group;

the reference target direction of the new waveband generated in the elite group is generated from a template value in the garbage collection group;

the template value comprises: an elite group template $e_e$ and a garbage collection group template $e_l$; the template value is taken from a mean value of the wavelengths of the wavebands in the group where the template value is located;

an expression of generating a candidate waveband by the new waveband $x_r$ generated in the ordinary group after selecting the learning behavior is:

$$x_c = (1-\gamma)x_r + \gamma e_e \quad (3); \text{ and}$$

an expression of generating a candidate waveband by the new waveband $x_r$ generated in the elite group after selecting the learning behavior is:

$$x_c = (1-\gamma)x_r + \gamma e_l \quad (4),$$

wherein in Formula, $\gamma$ represents a random number in an interval [0,1], and $x_c$ represents a candidate waveband.

5. The method for near-infrared spectral wavelength selection based on an iTPA according to claim 4, wherein the new waveband generates a candidate waveband through an exploration behavior, comprising:

$$x_c = [x_{c1}, x_{c2}, \ldots, x_{cn}]^T \quad (5)$$

$$x_{ci} = \begin{cases} x_{ri} + \gamma_i t_{e,p}(b_i - x_{ri}), m_i = 0 \\ x_{ri} + \gamma_i t_{e,p}(x_{ri} - a_i), m_i = 1 \end{cases}$$

$$t_{e,p} = \left(1 - \frac{k}{K}\right)^{a_{e,p}},$$

wherein in Formula, T represents a matrix transposition symbol, and $x_{ri}$ represents a wavelength corresponding to the new waveband, that is, a ith wavelength of the waveband, i=1, 2, . . . , n; K represents a maximum number of iterations of the algorithm, and k represents a current cumulative number of iterations;

a shrinkage index $a_{e,p}$ represents: $a_e$ is selected when the new waveband is inherited from the elite group, and $a_p$ is selected when the new waveband is inherited from the ordinary group; and $\gamma_i$ represents a random number in an interval (0, 1), and $m_i$ takes a value between 0 and 1 randomly.

6. The method for near-infrared spectral wavelength selection based on an iTPA according to claim 5, wherein before step 1, the method further comprises: eliminating abnormal data in spectra by a Mahalanobis distance, and dividing the remaining sample points into calibration sets and prediction sets by a K-S method after eliminating the abnormal data in the spectra.

7. The method for near-infrared spectral wavelength selection based on an iTPA according to claim 6, wherein the update of the candidate waveband in step 5 comprises:

if an evaluation value of the candidate waveband $x_c$ is higher than an evaluation value of the last $x_{ewst}$ in the elite group, $x_c$ enters the elite group, at the same time, evaluation values in the elite group are sorted again, and the last $x_{ewst}$ in the elite group after sorting again is directly eliminated without entering the ordinary group; the $x_{ewst}$ is a waveband with a lowest evaluation value in the elite group;

if the evaluation value of the candidate waveband $x_c$ is lower than an evaluation value of the $x_{ewst}$ but higher than an evaluation value of the last $x_{pwst}$ in the ordinary group, whether the $x_c$ is obtained by exploration is checked, if the $x_c$ is obtained by exploration, the $x_c$ enters the ordinary group, at the same time, evaluation values in the ordinary group are sorted again, and the last $x_{pwst}$ in the ordinary group after sorting again is eliminated; the $x_{pwst}$ is a waveband with a lowest evaluation value in the ordinary group; if the $x_c$ is not obtained by exploration, the $x_c$ is directly discarded;

if the evaluation value of the candidate waveband $x_c$ is lower than an evaluation value of a first $x_{lbst}$ in the garbage collection group, the $x_c$ enters the garbage collection group, at the same time, evaluation values in the garbage collection group are sorted again, and a $x_{lbst}$ waveband in the garbage collection group after sorting again is eliminated to enable the evaluation values in the garbage collection group to be low all the time; the $x_{lbst}$ is a waveband with a highest evaluation value in the garbage collection group; and after the update of the waveband every time, the evaluation values in the three groups are sorted.

8. The method for near-infrared spectral wavelength selection based on an iTPA according to claim 7, wherein a shrinkage index of the new waveband inherited from the ordinary group is half of that inherited from the elite group.

9. The method for near-infrared spectral wavelength selection based on an iTPA according to claim 8, wherein a probability of selecting the learning behavior by a new member is 0.35, and a probability of selecting the exploration behavior by the new member is 0.65.

10. The method for near-infrared spectral wavelength selection based on an iTPA according to claim 9, wherein the method is applied to wavelength selection in non-destructive detection of crops.

* * * * *